US007743406B2

(12) United States Patent
Abedi et al.

(10) Patent No.: US 7,743,406 B2
(45) Date of Patent: Jun. 22, 2010

(54) SYSTEM AND METHOD OF PREVENTING ALTERATION OF DATA ON A WIRELESS DEVICE

(75) Inventors: Scott Sina Abedi, Durham, NC (US); Roger Kenneth Abrams, Raleigh, NC (US); Ryan Charles Catherman, Raleigh, NC (US); James Patrick Hoff, Raleigh, NC (US); James Stephen Rutledge, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1580 days.

(21) Appl. No.: 11/019,040

(22) Filed: Dec. 21, 2004

(65) Prior Publication Data

US 2006/0133612 A1 Jun. 22, 2006

(51) Int. Cl.
*H04L 9/32* (2006.01)

(52) U.S. Cl. .............................. 726/2; 726/10; 713/156

(58) Field of Classification Search ..................... 726/3, 726/5, 17–21, 27, 32; 455/3.01, 403, 426.1, 455/439, 456.6, 462, 465, 11.1, 517, 703, 455/45–78, 554.1–554.2, 555, 556.1–556.2, 455/557, 560, 113, 115.3, 134, 151.2, 226.2, 455/227, 227.2; 370/214, 230–236, 374, 370/377, 384, 395.1, 395.52; 709/225, 227–229, 709/33, 241; 380/270–271; 725/62–67, 725/73, 81, 93, 123; 348/14.02, 14.12
See application file for complete search history.

(56) References Cited

U.S. PATENT DOCUMENTS 5,410,737 A * 4/1995 Jones ......................... 455/454
5,752,164 A * 5/1998 Jones ......................... 455/454
5,905,860 A * 5/1999 Olsen et al. ................... 726/27
5,935,244 A 8/1999 Swamy et al.
5,949,881 A 9/1999 Davis
6,032,257 A 2/2000 Olarig et al.
6,286,102 B1 9/2001 Cromer et al.
6,330,450 B1 * 12/2001 Wallstedt et al. ............ 455/447
6,425,084 B1 7/2002 Rallis et al.
6,594,765 B2 7/2003 Sherman et al.
6,605,872 B1 * 8/2003 Kim et al. ................... 257/752
6,609,204 B1 8/2003 Olarig et al.
6,628,198 B2 9/2003 Fieschi et al.
6,664,925 B1 * 12/2003 Moore et al. ................ 342/451
6,763,315 B2 * 7/2004 Xydis ......................... 702/127

(Continued)

FOREIGN PATENT DOCUMENTS

GB 2391-098 A 1/2004

*Primary Examiner*—Kimyen Vu
*Assistant Examiner*—Leynna T Truvan
(74) *Attorney, Agent, or Firm*—Dillon & Yudell LLP

(57) ABSTRACT

A system and method for securing data on a wireless device. A secured zone is defined by a boundary sensor. A data processing system is coupled to the boundary sensor and a wireless device. If the data processing system detects that the signal strength of the wireless device has fallen below a first predetermined value for longer than a second predetermined value, the data processing system deletes a digital certificate corresponding to the wireless device from memory. Thus, when the wireless device is reintroduced into the secured zone, in response to determining that a digital certificate corresponding to the wireless device is not stored in memory, the disabling module disables the wireless device from operation within the secured zone.

9 Claims, 5 Drawing Sheets

U.S. PATENT DOCUMENTS

| | | | | |
|---|---|---|---|---|
| 6,970,862 | B2 * | 11/2005 | Kwan | 707/3 |
| 7,007,166 | B1 * | 2/2006 | Moskowitz et al. | 713/176 |
| 7,034,659 | B2 * | 4/2006 | Ungs | 340/5.74 |
| 7,048,195 | B2 * | 5/2006 | Berstis | 235/492 |
| 7,076,271 | B2 * | 7/2006 | Ban et al. | 455/556.1 |
| 7,079,922 | B2 * | 7/2006 | Komai | 700/237 |
| 7,190,980 | B2 * | 3/2007 | Deolalikar et al. | 455/574 |
| 7,197,550 | B2 * | 3/2007 | Cheline et al. | 709/223 |
| 7,260,401 | B2 * | 8/2007 | Chen et al. | 455/437 |
| 7,324,478 | B2 * | 1/2008 | Park et al. | 370/331 |
| 7,359,675 | B2 * | 4/2008 | Lastinger et al. | 455/63.1 |
| 7,383,446 | B1 * | 6/2008 | Hatanaka et al. | 713/193 |
| 7,383,577 | B2 * | 6/2008 | Hrastar et al. | 726/23 |
| 2003/0135751 | A1 | 7/2003 | O'Donnell et al. | |
| 2003/0160809 | A1 | 8/2003 | Marion et al. | |
| 2004/0015403 | A1 | 1/2004 | Moskowitz et al. | |
| 2004/0111320 | A1 | 6/2004 | Schlieffers et al. | |

* cited by examiner

SYSTEM AND METHOD OF PREVENTING ALTERATION OF DATA ON A WIRELESS DEVICE

BACKGROUND OF THE INVENTION

1. Technical Field

The present invention relates in general to data processing systems and, more particularly, portable data processing systems. Still more particularly, the present invention relates to securing data stored in portable data processing systems.

2. Description of the Related Art

Due to recent developments in wireless technology, wireless products such as a wireless-enabled slate, tablet PC, or personal digital assistant (PDA) type device (hereinafter referred to as an "almond") may be attached to shopping carts to greatly enhance a customer's shopping experience. The almond may store a variety of information, including customer shopping lists, customer credit card numbers, or even a set of consumer preferences that enable the almond to present a list of suggested products that might be of interest to the customer.

The sensitive nature of the information requires that the almond must be protected by some security measures. Therefore, there is a need to implement security measures to protect the confidential information stored in almonds to ensure a secure shopping experience.

SUMMARY OF THE INVENTION

A system and method for securing data on a wireless device is disclosed. A secured zone is defined by a boundary sensor. A data processing system is coupled to the boundary sensor and a wireless device. The data processing system includes a signal detector to determine whether the emitted signal strength of the wireless device falls below a first predetermined value. Then, a timer that is included in the data processing system is utilized to determine if the emitted signal strength of the wireless device has fallen below the first predetermined value for longer than a second predetermined value. If the signal strength of the wireless device has fallen below a first predetermined value for longer than a second predetermined value, the data processing system deletes a digital certificate corresponding to the wireless device from memory. Thus, when the wireless device is reintroduced into the secured zone, in response to determining that a digital certificate corresponding to the wireless device is not stored in memory, the disabling module disables the wireless device from operation within the secured zone. The system and method insures that a compromised wireless device, which would be considered a security risk, is not introduced into the secured zone.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
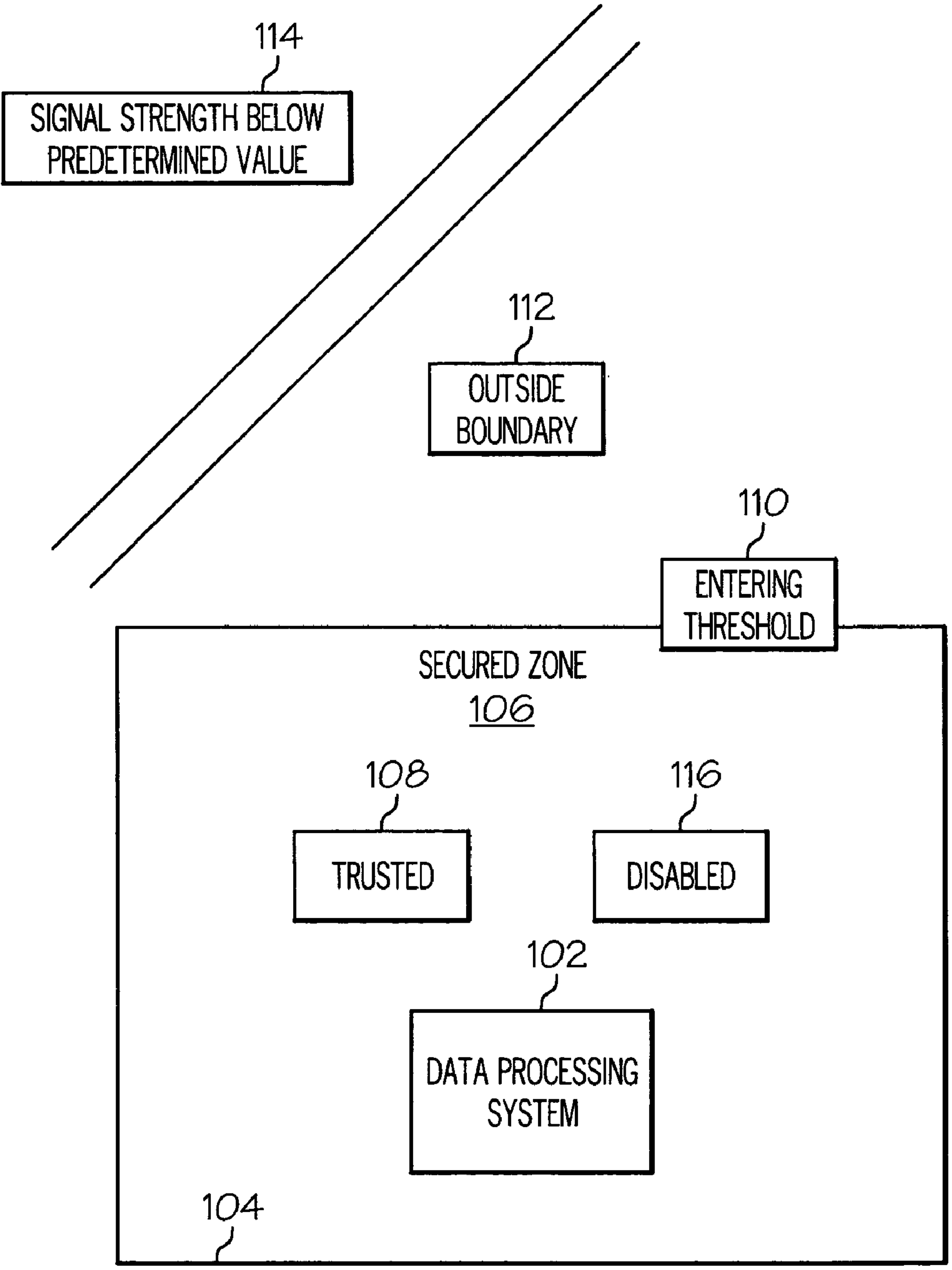
FIG. 1 is a block diagram of an exemplary security system in which a preferred embodiment of the present invention may be implemented.

With reference now to the figures, and in particular, with reference with FIG. 1, there is illustrated a block diagram of security system 100 in which a preferred embodiment of the present invention may be implemented. As depicted, data processing system 102 is coupled to boundary sensor 104 and wireless devices 108-116, which are similar to exemplary wireless device 250 depicted in FIG. 2B. While data processing system 102 is preferably coupled to wireless devices 108-116 via a wireless connection such as Bluetooth and Wi-Fi (IEEE protocol 802.11), data processing system 102 may be coupled to boundary sensor 104 via a wired (e.g., Ethernet, etc.) or wireless connection.

Data processing system 102 can be implemented as a computer. Any suitable computer, such as an IBM eServer computer or IntelliStation computer, which are products of International Business Machines Corporation, located in Armonk, N.Y. may be utilized. Data processing system also preferably includes a graphical user interface (GUI) that may be implemented by means of system software residing in computer media in operation with data processing system 102.

Boundary sensor 104, preferably placed at the boundary of secured zone 106, detects whether or not wireless devices 108-116 have transitioned through the boundary into secured zone 106. Wireless devices 108-116 are wireless devices recognized by security system 100 that are in various states depending upon position and/or configuration with respect to boundary sensor 104 and data processing system 102.

Wireless device 112 is located outside secured zone 106 and may be in an initialization state. This initialization state will be discussed herein in more detail in conjunction with FIG. 3A. Wireless device 110 is transitioning through the boundary into secured zone 106. Data processing system 102 queries wireless device 110 to determine whether the software stored in wireless device 110 has been subjected to unauthorized alteration. If the software in wireless device 110 has been subjected to unauthorized alteration, wireless device 110 would be a security risk because a compromised wireless device would be introduced into secured zone 106.

Wireless device 108 is a device that contains software that has been verified by data processing system 102 to not have been subjected to unauthorized alteration. Data processing system 102 has enabled wireless device 108 for operation within secured zone 106.

Wireless device 116 is a device that contains data that has been determined by data processing system 102 to have been subjected to unauthorized alteration. While wireless device 116 is located within secured zone 106, data processing system 102 has not enabled wireless device 116 for operation within secured zone 106. In fact, data processing system 102 has disabled wireless device 116 and issued a notification preferably in the form of a silent, audible, and/or visual alarm.

Wireless device 114 is a device that is located far enough away from secured zone 108 for data processing system 102 to determine that the strength of the signal emitted from wireless device 114 has been reduced below a predetermined value. When securing the data stored on a wireless device, one of the main concerns involves preventing an individual from removing the wireless device from the vicinity of secured zone 106, performing an unauthorized alteration of the software stored on the wireless device, and re-introducing the altered wireless device into secured zone 106. An individual who modified the software on the altered wireless device would then have access to the system within secured zone 106 and could possibly steal any confidential information later entered into the altered wireless device by a user or administrator. Data processing system 102 will indicate in memory 204 which wireless device 250 whose emitted signal strength has been reduced below a predetermined value for a predetermined amount of time. When an individual attempts to re-introduce that wireless device 250 into secured zone 106, data processing system 102 will deny wireless device 250 operation in secured zone 106, discussed herein in more detail.

Figure 2A:
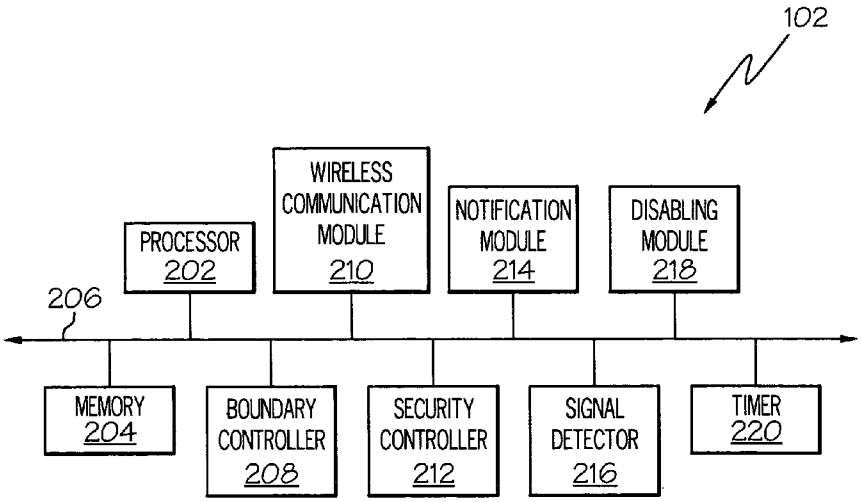
FIG. 2A is a more detailed block diagram of a data processing system in accordance with a preferred embodiment of the present invention.

Referring to FIG. 2A, there is depicted a more detailed block diagram of a data processing system 102 in which a preferred embodiment of the present invention may be implemented. As depicted, processor 202 and memory 204 are coupled by interconnect 206. Also coupled by interconnect 206 are boundary controller 208, wireless communication module 210, security controller 212, notification module 214, signal detector 216, disabling module 218, and timer 220.

Boundary controller 208 interfaces with boundary sensor 104 to detect whether or not a wireless device has transitioned into secured zone 106. Wireless communication module 210 enables data processing system 102 to communicate with boundary sensor 104 and a collection of wireless devices, similar to exemplary wireless device 250 depicted in FIG. 2B. Persons having ordinary skill in this art will appreciate that wireless communication module 210 may implement any wireless communication protocol such as Bluetooth or Wi-Fi (IEEE protocol 802.11).

Security controller 212 works in conjunction with boundary controller 208, notification module 214, and signal detector 216 to determine whether or not a wireless device 250 is authorized to operate within secured zone 106. Once boundary controller 208 has determined that at least one wireless device 250 has transitioned into secured zone 108, security controller 212 queries wireless devices 250 to determine if the software stored on wireless devices 250 has been subjected to unauthorized alteration. Once the software on wireless devices 250 are determined to not have been subjected to unauthorized alteration, security controller 212 enables the wireless devices 250 for operation in secured zone 106. However, if security controller 212 determines that the software on wireless devices 250 have been subjected to unauthorized alteration, notification module 214 sends out a notification. Such notification can take the form of a silent, visual, or audible alarm. Also, the notification can include a message to the user that the software and data stored on wireless device 250 will be erased or destroyed. The command to erase or destroy the software and data on wireless device 250 may also be issued by disabling module 218.

One of the objects of the present invention involves preventing individuals from removing wireless devices 250 from the secured environment, altering the software stored in the removed wireless devices and reintroducing altered wireless devices into secured zone 106. Signal detector 216 measures the strength of the signal emitted by each wireless device 250. Disabling module 218 may disable any wireless device 250 whose emitted signal strength has been reduced below a predetermined value for a predetermined amount of time. Timer 220 determines the amount of time the emitted signal strength of a particular wireless device 250 has fallen below a predetermined level. The details of the disablement process will be discussed herein in more detail in conjunction with FIGS. 3B and 3C.

Figure 2B:
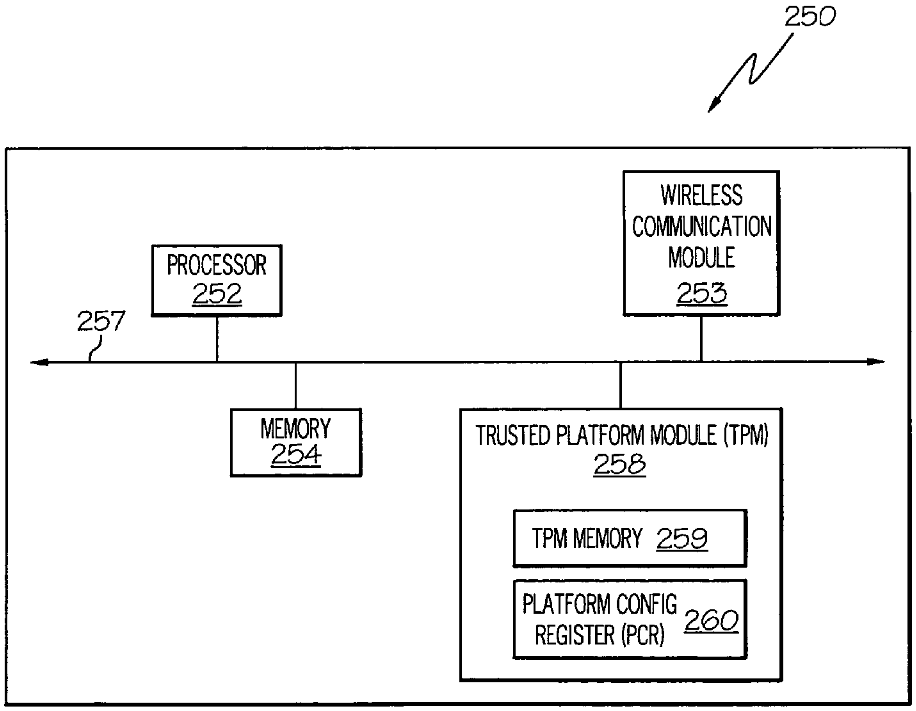
FIG. 2B is a more detailed block diagram of a wireless device in accordance with a preferred embodiment of the present invention.

With reference to FIG. 2B, there is depicted a more detailed block diagram of an exemplary wireless device 250 in which a preferred embodiment of the present invention may be implemented. Any suitable wireless device, such as a PDA, notebook computer, or tablet PC may be utilized to implement wireless device 250.

As depicted, wireless device 250 includes processor 252, wireless communication module 253, memory 254, and trusted platform module 258. Interconnect 257 couples all modules within wireless device 250. Wireless communication module 253 enables wireless device 250 to communicate with data processing system 102. Persons with ordinary skill in this art will appreciate that wireless communication module 253 may be an integrated module, such as the Intel® PRO/Wireless Network Connection, which is a product of Intel Corporation, located in Santa Clara, Calif. Wireless communication module 253 may also be an add-on module, such as a Linksys Wireless-G notebook PCM/CIA adapter, which is a product of Cisco Systems, Inc., located in San Jose, Calif.

To ensure the security of the data stored in memory 254 and Trusted Platform Module 258, wireless device 250 preferably utilizes a public key cryptography algorithm, such as the Rivest, Shamir, and Adleman (RSA) algorithm. Public key cryptosystems utilize two keys: a public key and a private key. Data encrypted by one key can be decrypted only by the corresponding other key. The system and the keys are designed so that one key (the public key) can be made public, without compromising the other key (the private key).

Trusted platform module 258 is preferably utilized to communicate with data processing system 102 to implement the security protocol of the present invention. At initialization, wireless device 250 generates a trusted platform module endorsement key, utilized to set and encrypt an owner password that allows an administrator to perform remote management functions on wireless device 250. The trusted platform module endorsement key and generated owner password is stored in TPM memory 259. Also stored in TPM memory 259 is a stored root key (SRK), which functions as a master key for all private keys generated by wireless device 250. Platform configuration register (PCR) 260 stores a hash value of the software stored in memory 254. The utilization of the hash value by wireless device 250 and data processing system 102 will be discussed herein in more detail in conjunction with FIGS. 3A and 3B.

Figure 3A:
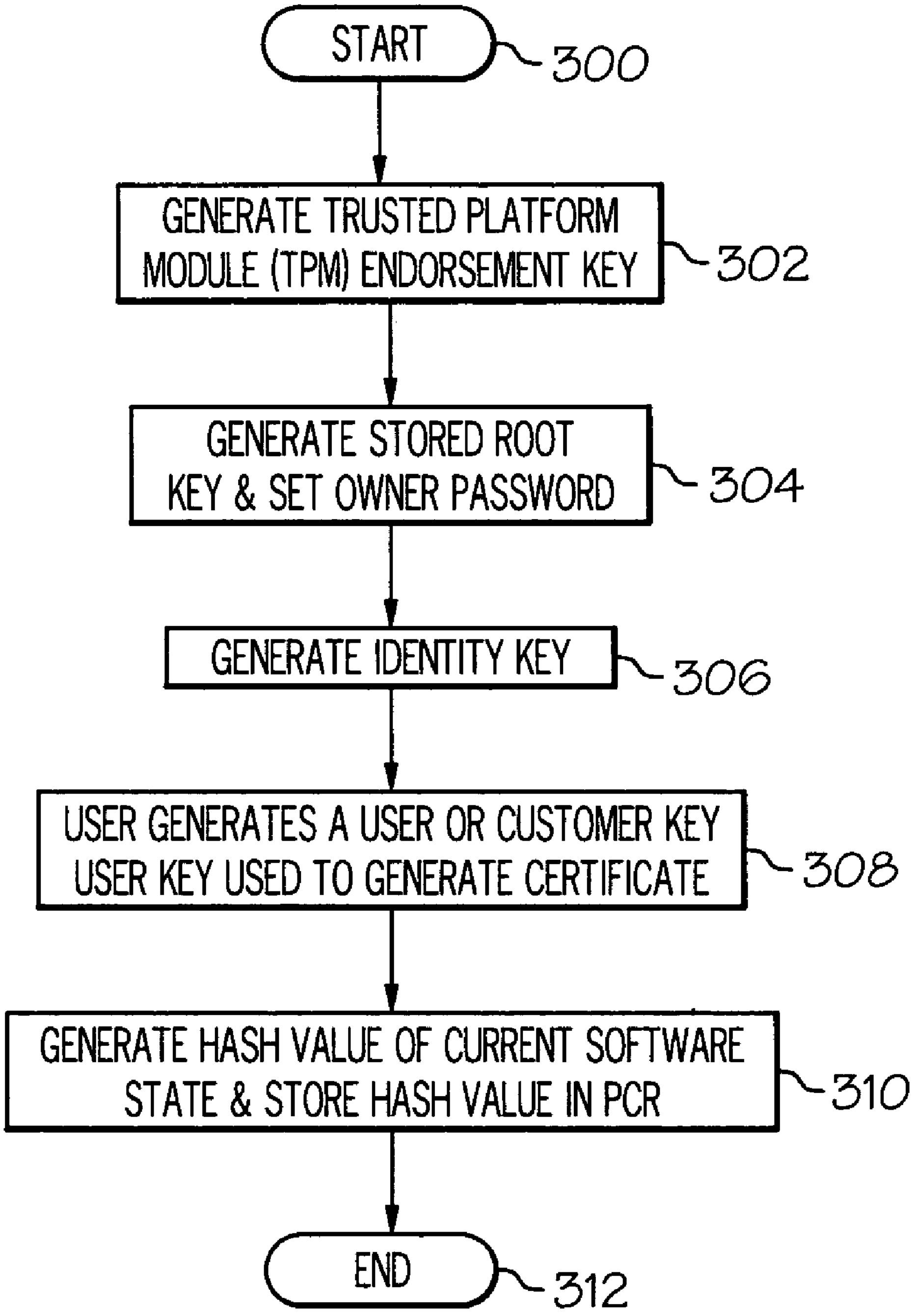
FIG. 3A is a high-level logical flowchart diagram depicting an exemplary initialization of a wireless device in accordance with a preferred embodiment of the present invention.

Referring to FIG. 3A, there is illustrated a high-level logical flowchart of an exemplary initialization of a wireless device according to a preferred embodiment of the present invention. The owner of the security system is hereinafter referred to as "owner". Consequently, a user of a wireless device 250 is hereinafter referred to as a "user". The process begins at step 300 and continues to step 302, which depicts wireless device 250 generating a trusted platform module (TPM) endorsement key. The process then continues to step 304, which illustrates wireless device 250 utilizing the trusted platform module (TPM) endorsement key to generate a stored root key, which acts as a parent or master key for all other keys generated and stored within trusted platform module 258. Also depicted in step 304, wireless device 250 also sets an owner password to enable the owner to perform remote management functions on wireless device 250.

The process then continues to step 306, which illustrates wireless device 250 generating an identity key, which may be stored within memory 254 of wireless device 250. Wireless device 250 utilizes the identity key to digitally sign the values stored within platform configuration registers (PCR) 260. Wireless device 250 preferably utilizes a public key cryptography standard to perform digital signatures. The process then proceeds to step 308, which depicts a user of wireless device 250 generating a user or customer key. The user key is then utilized as a Certificate Authority key to generate a digital certificate. The digital certificate preferably includes: (1) a public key, (2) data describing the public key or security attributes, and (3) a signature (the user key utilized for signing a hash of the certificate). The digital certificate may be stored in data processing system 102 or at some remote location. Typically, a digital certificate enables the recipient of a digitally signed message to verify that the message was in fact sent by the purported sender. The recipient, in this case, data processing system 102, compares a message sent by wireless device 250 with the information on the digital certificate to authenticate the identity of wireless device 250.

Once data processing 102 confirms the identity of wireless device 250, the process then continues to step 310, which depicts wireless device 250 generating a hash value of the state of the software stored in memory 254 and storing the hash value into platform configuration register (PCR) 260. A hash is a one-way function that takes any data and creates a unique 20 byte value. Hashes are typically utilized for data integrity checking. For example, a hash may be taken of a file stored in a data processing system. If even a single bit of the file changes, a hash taken of the changed value would result in a very different hash value. Therefore, the utilization of hash functions enables an easy indication of whether or not a file has been altered or corrupted. The process continues to step 312, which illustrates the ending of the initialization process.

Figure 3B:
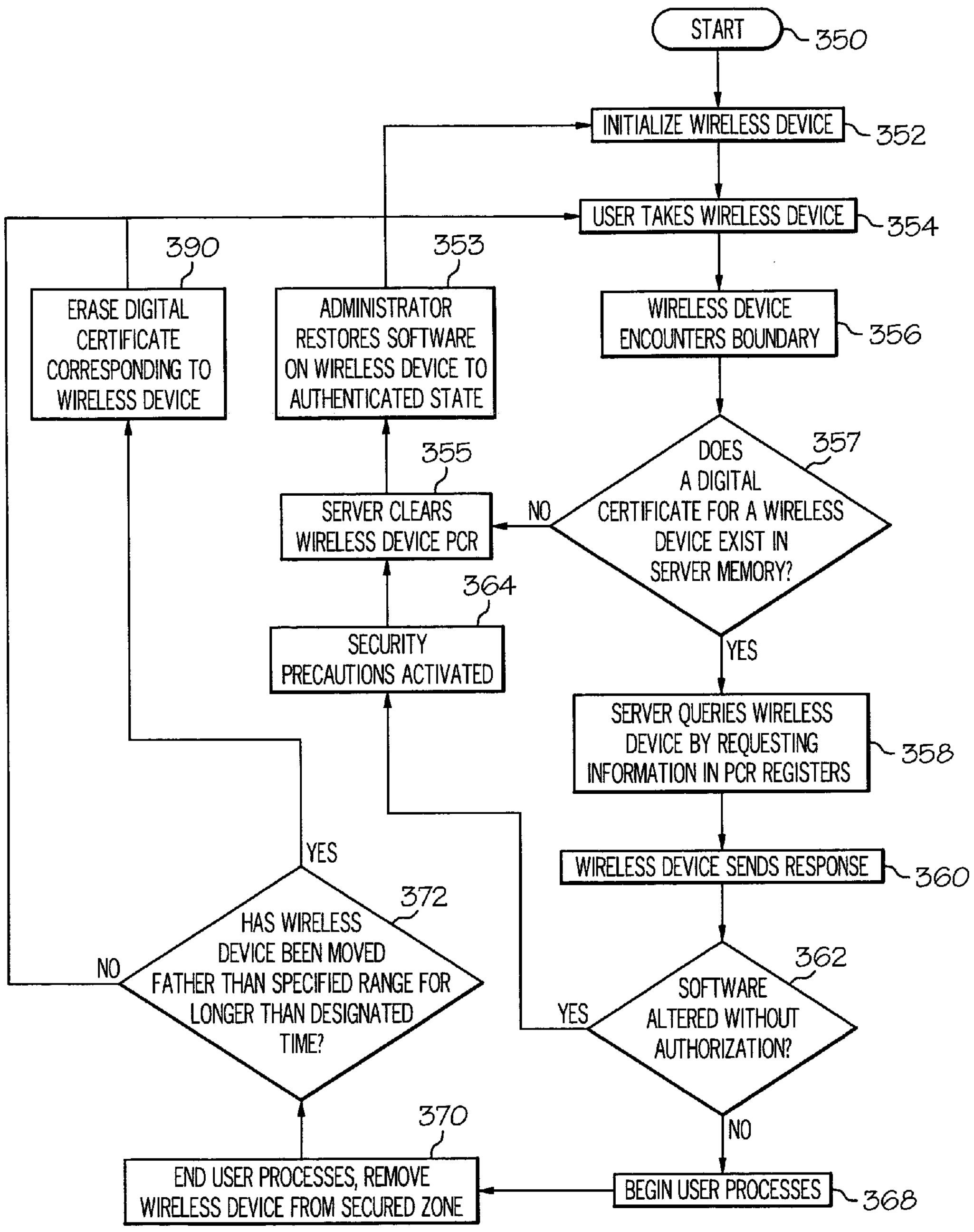
FIG. 3B is a high-level logical flowchart diagram illustrating an exemplary data security system operation in accordance with a preferred embodiment of the present invention.

With reference to FIG. 3B, there is depicted a high-level logical flowchart of an exemplary data security system operation in accordance with a preferred embodiment of the present invention. The process begins at step 350 and proceeds to step 352, which depicts the initialization process of wireless device 250 as described in FIG. 3A. The process then continues to step 354, which illustrates the user selecting a wireless device for use within secured zone 106. The process depicted in step 354 may also include the loading of the confidential user information onto memory 254 of wireless device 250. The loading procedure may be performed in a variety of methods. For example, the user may key or scan in information such as a credit card number, shopping list, or user preferences. Alternatively, the user may specify these preferences before arriving outside secured zone 106 on a remote computer, such as a personal computer that is connected to the internet. After the user selects the preferences, the user may send the selections to data processing system 102 via a communications network such as the internet. When the user arrives outside of secured zone 106, the user may identify himself to wireless device 250 via a magnetic card, thumbprint scanner, personal identification number (PIN), or other means of personal identification. Wireless device 250 will request the preferences from data processing system 102. Data processing system 102 will then send the preferences to wireless device 250.

The process then continues to step 356, which illustrates wireless device 250 encountering boundary sensor 104, which monitors any transition across the boundary into secured zone 106. The process continues to step 357, which depicts data processing system 102 determining whether or not a digital certificate corresponding to wireless device 250 is present in memory 204. As previously discussed in conjunction with step 308 of FIG. 3A, the initialization of wireless device 250 includes the generation of a digital certificate to enable the recipient to authenticate the purported sender of a digitally signed message. If data processing system 102 determines that a digital certificate corresponding to wireless device 250 is not stored in memory 204, the process then proceeds to step 355, which illustrates data processing system 102 clearing platform configuration registers (PCR) 260 corresponding to wireless device 250. The process continues to step 353, which depicts the administrator of security system 100 taking wireless device 250 offline and restoring the software stored in wireless device 250 back to an authenticated state. Then, the process continues to step 352 (the initialization of wireless device 250) and continues in an iterative fashion.

As discussed in more detail herein, if data processing system 102 does not have stored in memory 204 a digital certificate corresponding to a particular wireless device 250, data processing system 102 assumes that particular wireless device 250 has either: (1) not been initialized or (2) had been moved farther than a specified range for longer than a designated time (resulting in an emitted signal strength of wireless device 250 below a predetermined value), where in response, data processing system 102 deleted the digital certificate corresponding to the particular wireless device 250.

However, if data processing system 102 determines that a digital certificate corresponding to wireless device 250 is stored in memory 204, the process proceeds to step 358, which depicts data processing system 102 querying wireless device 250 for hash value stored in the platform configuration registers (PCR). The process then continues to step 360, which illustrates wireless device 250 sending the requested hash value stored in the platform configuration registers (PCR) with a signed digital certificate. The digital certificate enables data processing system 102 to determine whether the received hash value was actually sent by wireless device 250.

Then, the process proceeds to step 362, which depicts data processing system determining whether or not the software stored in memory 254 of wireless device 250 has been altered without authorization. Data processing system 102 compares the received hash value with a predetermined hash value that represents the authorized configuration of the software stored in memory 254 of wireless device 250. If the hash values are different, the software stored in wireless device 250 has undergone an unauthorized alteration. If data processing system 102 determines that the software stored in wireless device 250 has been altered without authorization (e.g., the received hash value does not match the predetermined hash value stored in data processing system 102), the process continues to step 364, which illustrates notification module 214 of data processing system 102 activating security precautions. As previously described, the security precautions may take various forms, such as an audible, visual, or silent alarm, or the erasure of data stored in memory 254 of wireless device 250 in response to a command issued by disabling module 218. The process then continues to step 355, and continues in an iterative fashion.

Returning to step 362, if data processing system 102 determines that the software stored in wireless device 250 has not been altered without authorization, the process continues to step 368, which illustrates the beginning of user processes within secured zone 106. One embodiment of user processes may include implementing secured zone 106 as a shopping area. The user pushes a shopping cart that includes an attached wireless device 250. Wireless device 250 may include credit card numbers the user utilizes to checkout, a shopping list, and a list of preferences that allows the display of shopping item suggestions to the user.

The process then continues to step 370, which depicts the ending of the user processes and the removal of wireless device 250 from secured zone 106. For example, the user may have completed his shopping, checked out at the counter, and returned wireless device 250 to a staging area outside of secured zone 106.

The process continues to step 372, which illustrates data processing system 102 determining whether or not wireless device 250 has been moved farther than a specified range for longer than a designated time. This security feature prevents an individual from removing wireless device 250 from the premises, performing an unauthorized alteration of the data and/or software stored in wireless device 250, and reintroducing the compromised wireless device into secured zone 106. Step 372 is described in more detail in conjunction with FIG. 3C. If data processing system 102 has determined that wireless device 250 has been removed farther than a specified range for longer than a designated amount of time, the process moves to step 390, while illustrates data processing system 102 erasing the digital certificate corresponding to wireless device 250 from memory 204. The process then returns to step 354 and continues in an iterative fashion. However, if data processing system 102 determines that wireless device 250 has not been moved farther than the specified range for longer than the designated time, the process proceeds to step 352 and continues in an iterative fashion.

Figure 3C:
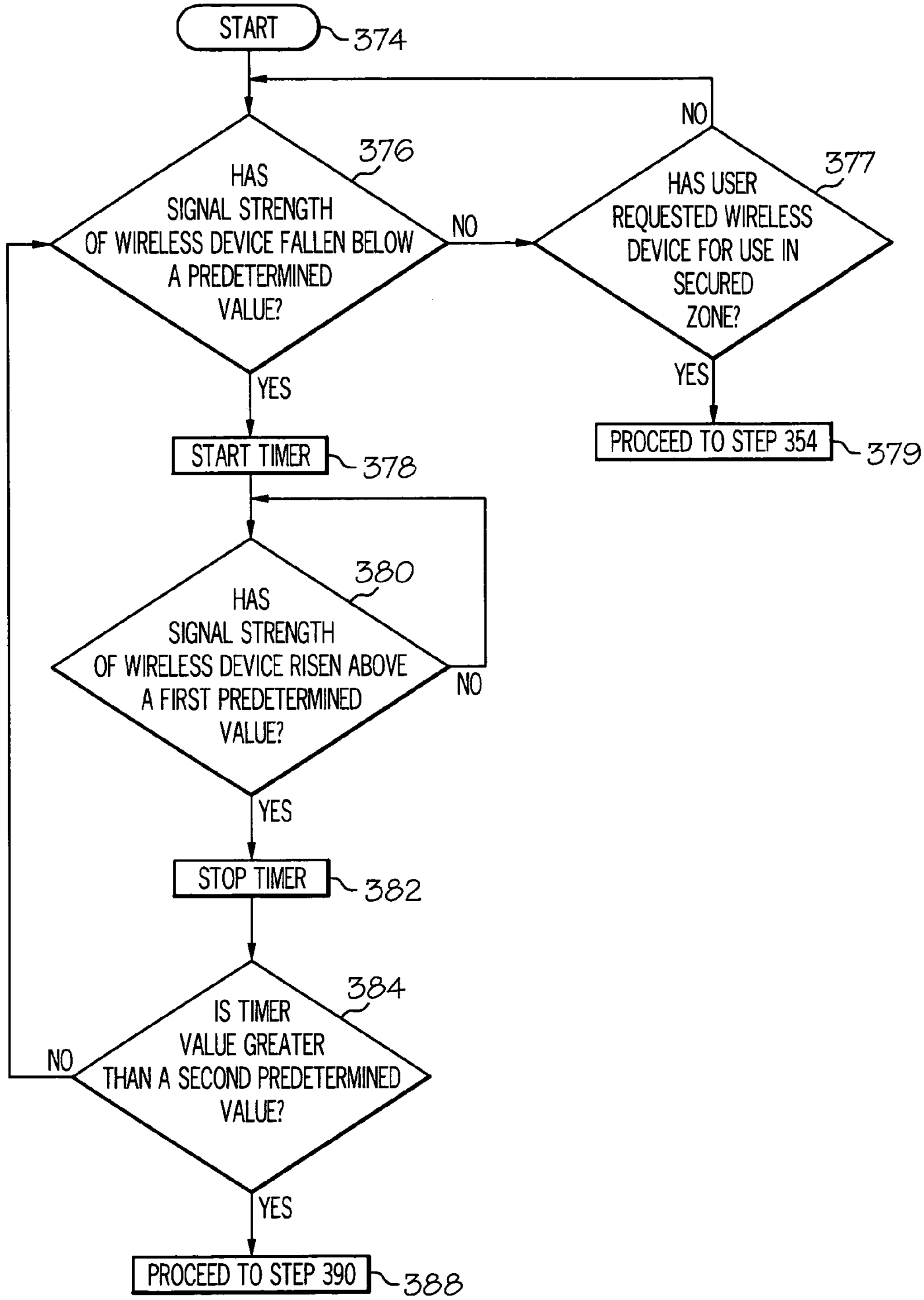
FIG. 3C is a high-level logical flowchart diagram depicting an exemplary data security system determining the signal strength emitted by an exemplary wireless device in accordance with a preferred embodiment of the present invention.

Referring to FIG. 3C, there is illustrated a high-level logical flowchart diagram depicting exemplary data security system determining the signal strength emitted by an exemplary wireless device in accordance with a preferred embodiment of the present invention. The process begins at step 374 and continues to step 376, which depicts signal detector 216 determining whether or not the signal strength emitted by wireless device 250 has fallen below a first predetermined value. If the signal strength has not fallen below a first predetermined value, the process iterates at step 376. Data processing system 102 measures signal strength emitted from wireless device 250 as a means of determining how far a particular wireless device 250 is in relation to secured zone 106. As the signal strength emitted from wireless device 250 gets weaker, the farther wireless device 250 is in relation to secured zone 106. If the wireless device 250 is being removed from secured zone 106, an individual may be removing wireless device 250 without authorization and that particular wireless device 250 may become a security risk if that particular wireless device 250 is tampered with and re-introduced into security system 100. However, if the signal strength has fallen below a first predetermined value, the process continues to step 378, which illustrates the starting of timer 220 to determine how long the signal strength of wireless device has fallen below a first predetermined value.

The process then continues to step 380, which depicts signal detector 216 determining whether or not the emitted signal strength of wireless device 250 has risen above a first predetermined value. If the emitted signal strength has not risen above a first predetermined value, the process iterates at step 380. However, if the emitted signal strength has risen above a first predetermined value, the process continues to step 382, which illustrates signal detector 216 stopping timer 220. Then, the process proceeds to step 384, which depicts processor 202 of data processing system 102 determining whether or not the timer value is greater than a second predetermined value. If the timer value is not greater than a second predetermined value, the process returns to step 376 and continues in an iterative fashion. The second predetermined value is a value that may be set by the administrator of the security system that indicates the maximum amount of time wireless device 250 may spend outside of a predetermined radius from data processing system 102. This second predetermined value prevents wireless device 250 from being stolen, subjected to unauthorized alteration, and returned to secured zone 106.

Returning to step 384, if the timer value is greater than a predetermined value, the process continues to step 386, which illustrates data processing system 102 deleting the digital certificate corresponding to wireless device 250. Without a digital certificate, wireless device 250 will not be authorized to operation within secured zone 106. The process then continues to step 388, which depicts the process continuing to step 390, as described earlier, returning to step 352 and continuing in an iterative fashion.

As been described, a security system includes a secured zone, a data processing system, and a collection of wireless devices that include confidential information stored in memory. To secure the confidential information stored on the wireless devices, each time a wireless device enters into the secured zone, the data processing system queries the wireless device and determines whether or not the software on the wireless device has been subjected to unauthorized alteration or corruption. This boundary query enables the data processing system to allow only trusted wireless devices to operate within the secured zone. Also, the data processing system monitors the emitted signal strength of each wireless device. If the emitted signal strength of a particular wireless device falls below a first predetermined value for longer than a predetermined amount of time, a digital certificate associated with that particular wireless device is deleted from the data processing system memory. The wireless device will not be allowed to operate within the secured zone unless it has been re-initialized. This disclosed system and method provides the user of a wireless device within the secured zone assures that the user's confidential information stored on the wireless device is secure.

It should be understood that at least some aspects of the present invention may alternatively be implemented in a program product. Program defining functions on the present invention can be delivered to a data storage system or a computer system via a variety of signal-bearing media, with include, without limitation, non transitory non-writable storage media (e.g., CD-ROM), non transitory writeable storage media (e.g., floppy diskette, hard disk drive, read/write CD-ROM, optical media), and non transitory communication media, such as computer and telephone networks including Ethernet. It should be understood, therefore in such signal-bearing media carrying or encoding computer readable instructions that direct method functions in the present invention, represent alternative embodiments of the present invention. Further it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail my be made therein without departing from the spirit and scope of the invention.

What is claimed is:

1. A system for securing data, comprising:

at least a wireless device;

a data processing system, coupled to said at least a wireless device, wherein said data processing system disables said at least a wireless device in response to determining that an emitted signal strength of said at least a wireless device is less than a first predetermined value for greater than a period of time represented by a second predetermined value; and a memory for storing at least a digital certificate corresponding to said at least a wireless device to authenticate communication from said at least a wireless device, wherein said digital certificate is removed from said memory in response to determining said emitted signal strength of said at least a wireless device is less than said first predetermined value for greater than said period of time represented by said second predetermined value.

2. The system according to claim 1, wherein said data processing system further comprises:

a signal detector for measuring said emitted signal strength of said at least a wireless device; and a timer for determining whether said emitted signal strength of said at least a wireless device is less than said first predetermined value for greater than said period of time represented by said second predetermined value.

3. The system according to claim 1, wherein said data processing system further comprises:

a disabling module for disabling said at least a wireless device in response to determining said memory does not include said at least a digital certificate corresponding to said at least a wireless device.

4. A method for securing data, comprising:

detecting an emitted signal strength from at least a wireless device;

in response to determining said emitted signal strength from said at least a wireless device is less than a first predetermined value for greater than a period of time represented by a second predetermined value, disabling said at least a wireless device; and storing, in a memory, at least a digital certificate corresponding to said at least a wireless device to authenticate communication from said at least a wireless device, wherein said digital certificate is removed from said memory in response to determining said emitted signal strength of said at least a wireless device is less than said first predetermined value for greater than said period of time represented by said second predetermined value.

5. The method according to claim 4, further comprising:

measuring said emitted signal strength from said at least a wireless device; and determining whether said emitted signal strength from said at least a wireless device is less than a first predetermined value for greater said period of time represented by said second predetermined value.

6. The method according to claim 4, said disabling further comprises:

in response to determining said at least a digital certificate corresponding to said at least a wireless device is not present in said memory, disabling said wireless device.

7. A computer program product, residing on a computer usable non-transitory storage medium, comprising:

program code to detect an emitted signal strength from at least a wireless device;

program code to disable said at least a wireless device, in response to determining said emitted signal strength from said at least a wireless device is less than a first predetermined value for greater than a period of time represented by a second predetermined value;

program code to store, in a memory, at least a digital certificate corresponding to said at least a wireless device to authenticate communication from said at least a wireless device, wherein said digital certificate is removed from said memory in response to determining said emitted signal strength of said at least a wireless device is less than said first predetermined value for greater said period of time represented by said second predetermined value.

8. The computer program product according to claim 7, further comprising:

program code for measuring said emitted signal strength from said at least a wireless device; and program code for determining whether said emitted signal strength from said at least a wireless device is less than a first predetermined value for greater said period of time represented by said second predetermined value.

9. The computer program product according to claim 7, said disabling further comprising:

in response to determining said at least a digital certificate corresponding to said at least a wireless device is not present in said memory, disabling said wireless device.

* * * * *